United States Patent [19]
Nakamaru et al.

[11] Patent Number: 5,732,322
[45] Date of Patent: Mar. 24, 1998

[54] RESIN COMPOSITION FOR SLIDING MEMBER AND SLIDING MEMBER

[75] Inventors: Takashi Nakamaru, Kanagawa-ken; Sumihide Yanase, Ebina; Akihiko Okimura, Yokohama, all of Japan

[73] Assignee: Oiles Corporation, Japan

[21] Appl. No.: 445,015

[22] Filed: May 22, 1995

[30]  Foreign Application Priority Data

May 23, 1994 [JP] Japan ................................. 6-132562

[51] Int. Cl.$^6$ ........................................................ B22F 7/04
[52] U.S. Cl. ............................ 428/550; 428/553; 428/551; 508/103; 508/105; 508/108; 508/109
[58] Field of Search ........................... 419/2; 428/55, 428/550, 553; 508/103, 105, 108, 109

[56]  References Cited

U.S. PATENT DOCUMENTS

| | | |
|---|---|---|
| Re. 26,088 | 9/1966 | Rulon-Miller et al. . |
| 5,162,157 | 11/1992 | Tanaka et al. . |
| 5,300,366 | 4/1994 | Nakamura et al. . |
| 5,354,622 | 10/1994 | Nakamaru et al. ............... 428/551 |
| 5,433,870 | 7/1995 | Nakamaru et al. . |

FOREIGN PATENT DOCUMENTS

| | | |
|---|---|---|
| 0 456 471 | 11/1991 | European Pat. Off. . |
| 0 581 185 | 2/1994 | European Pat. Off. . |
| 1 544 750 | 7/1969 | Germany . |
| 41 06 001 | 8/1991 | Germany . |

*Primary Examiner*—Daniel J. Jenkins
*Attorney, Agent, or Firm*—Nixon & Vanderhye

[57]  ABSTRACT

The disclosure describes a resin composition for a sliding member, comprising 1 to 25 wt % of component A selected from the group consisting of phosphates and barium sulfate, 1 to 15 wt % of component B selected from the group consisting of magnesium silicate and mica, and 5 to 50 wt % of component C selected from the group consisting of lead, tin, lead-tin alloy and mixtures thereof, the balance of polytetrafluoroethylene.

2 Claims, 2 Drawing Sheets

RESIN COMPOSITION FOR SLIDING MEMBER AND SLIDING MEMBER

BACKGROUND OF THE INVENTION

The present invention relates to a resin composition for a sliding member having excellent friction and wear characteristics, and the sliding member made from the resin composition.

Polytetrafluoroethylene (hereinafter referred to as "PTFE") has been popularly used for a sliding member such as bearings because of its excellent self-lubricating properties, a low friction coefficient, and high chemical and heat resistance properties.

A sliding member composed of PTFE alone, however, are poor in wear and creep resistances. As a result, in order to offset such defects, depending on the purpose of use of the produced sliding member, it has been essential:

(a) to incorporate a solid lubricant such as graphite, molybdenum disulfide or the like and/or reinforcing materials such as glass fiber, carbon fiber or the like in PTFE;

(b) to impregnate in the pores and coat on the surface of a porous sintered metal layer formed on a steel backing with PTFE; or (c) to fill in the meshes and coat on the surface of a metal mesh with PTFE.

The sliding member of the above mode (b) is called a composite-layered sliding member, which have been proposed in, for instance, Japanese Patent Publication (Kokoku) Nos. 31-2452, 39-16950 and 41-1868. In these patent publication is disclosed a composite-layered sliding member in which the pores and surface of the porous sintered metal layer formed on the steel backing are impregnated and coated with PTFE which may have blended therein a filler composed of lead or a lead compound.

The sliding member of the above mode (c) has been proposed in Japanese Patent Publication (Kokoku) No. 55-23740, etc. In this patent publication, is disclosed a self-lubricating lining foil composed of a metallic fabric, fluoroplastic and a material including an inorganic fiber reinforcement.

The sliding members mentioned above are low in friction coefficient and can achieve a satisfactory performance under many different use conditions, for example, under a dry condition, an oil-immersed condition or an oil-lubricated condition, but these sliding members are still unsatisfactory in durability.

In PTFE compositions for a sliding member, many fillers for engineering plastics, especially graphite, molybdenum disulfide, other metal sulfides, metal oxides and inorganic fibers such as glass fiber and carbon fiber are used. However, these fillers, although contributing to the improvement of wear resistance property of the sliding layer, tend to give rise to the problem of impairing the peculiar low friction properties of PTFE.

Thus, the development of a resin composition for sliding member having excellent friction and wear characteristics and durability under many different use conditions such as under dry condition, oil-immersed (in-oil) condition or oil-lubricated condition, and the sliding member composed of such a resin composition have been demanded.

As a result of strenuous present inventors' studies for attaining the above aim, it has been found that in the sliding member produced (1) by impregnating in pores and coating on the surface of a porous sintered metal layer formed on a steel backing with a resin composition, or (2) by filling in meshes and coating on the surface of a metal mesh with a resin composition, by using as the resin composition, a composition composed of PTFE and specified amounts of a component A selected from the group consisting of phosphates and barium sulfate, a component B selected from the group consisting of magnesium silicate and mica, and a component C selected from the group consisting of lead, tin, lead-tin alloy and mixtures thereof, the obtained sliding member shows excellent friction and wear properties and durability under many different use conditions such as dry condition, in-oil condition or oil-lubricated condition. The present invention has been attained on the basis of this finding.

SUMMARY OF THE INVENTION

In a first aspect of the present invention, there is provided a resin composition for a sliding member comprising 1 to 25% by weight of component A selected from the group consisting of phosphates and barium sulfate, 1 to 15% by weight of component B selected from the group consisting of magnesium silicate and mica, 5 to 50% by weight of component C selected from the group consisting of lead, tin, lead-tin alloy and a mixture thereof, and the balance of polytetrafluoroethylene.

In a second aspect of the present invention, there is provided a resin composition for a sliding member comprising 1 to 25% by weight of component A selected from the group consisting of phosphates and barium sulfate, 1 to 15% by weight of component B selected from the group consisting of magnesium silicate and mica, 5 to 50% by weight of component C selected from the group consisting of lead, tin, lead-tin alloy and a mixture thereof, not more than 5% by weight of molybdenum disulfide, and the balance of polytetrafluoroethylene.

In a third aspect of the present invention, there is provided a resin composition for a sliding member comprising 1 to 25% by weight of component A selected from the group consisting of phosphates and barium sulfate, 1 to 15% by weight of component B selected from the group consisting of magnesium silicate and mica, 5 to 50% by weight of component C selected from the group consisting of lead, tin, lead-tin alloy and a mixture thereof, not more than 4% by weight of graphite, and the balance of polytetrafluoroethylene.

In a fourth aspect of the present invention, there is provided a resin composition for a sliding member comprising 1 to 25% by weight of component A selected from the group consisting of phosphates and barium sulfate, 1 to 15% by weight of component B selected from the group consisting of magnesium silicate and mica, 5 to 50% by weight of component C selected from the group consisting of lead, tin, lead-tin alloy and a mixture thereof, not more than 5% by weight of conductive carbon black, and the balance of polytetrafluoroethylene.

In a fifth aspect of the present invention, there is provided a sliding member comprising a steel backing, a porous sintered metal layer formed thereon, and a sliding layer composed of a resin composition which is impregnated in and coated on the said porous sintered metal layer, the said resin composition comprising 1 to 25% by weight of component A selected from the group consisting of phosphates and barium sulfate, 1 to 15% by weight of component B selected from the group consisting of magnesium silicate and mica, 5 to 50% by weight of component C selected from the group consisting of lead, tin, lead-tin alloy and a mixture thereof, and the balance of polytetrafluoroethylene.

In a sixth aspect of the present invention, there is provided a sliding member comprising a steel backing, a porous sintered metal layer formed thereon, and a sliding layer composed of a resin composition which is impregnated in and coated on the said porous sintered metal layer, the said resin composition comprising 1 to 25% by weight of component A selected from the group consisting of phosphates and barium sulfate, 1 to 15% by weight of component B selected from the group consisting of magnesium silicate and mica, 5 to 50% by weight of component C selected from the group consisting of lead, tin, lead-tin alloy and a mixture thereof, not more than 5% by weight of molybdenum disulfide, and the balance of polytetrafluoroethylene.

In a seventh aspect of the present invention, there is provided a sliding member comprising a steel backing, a porous sintered metal layer formed thereon, and a sliding layer composed of a resin composition which is impregnated in and coated on the said porous sintered metal layer, the said resin composition comprising 1 to 25% by weight of component A selected from the group consisting of phosphates and barium sulfate, 1 to 15% by weight of component B selected from the group consisting of magnesium silicate and mica, 5 to 50% by weight of component C selected from the group consisting of lead, tin, lead-tin alloy and a mixture thereof, not more than 4% by weight of graphite, and the balance of polytetrafluoroethylene.

In an eighth aspect of the present invention, there is provided a sliding member comprising a steel backing, a porous sintered metal layer formed thereon, and a sliding layer composed of a resin composition which is impregnated in and coated on the said porous sintered metal layer, the said resin composition comprising 1 to 25% by weight of component A selected from the group consisting of phosphates and barium sulfate, 1 to 15% by weight of component B selected from the group consisting of magnesium silicate and mica, 5 to 50% by weight of component C selected from the group consisting of lead, tin, lead-tin alloy and a mixture thereof, not more than 5% by weight of conductive carbon black, and the balance of polytetrafluoroethylene.

In a ninth aspect of the present invention, there is provided a sliding member comprising a metal mesh and a sliding layer composed of a resin composition which is filled in and coated on the said metal mash, the said resin composition comprising 1 to 25% by weight of component A selected from the group consisting of phosphates and barium sulfate, 1 to 15% by weight of component B selected from the group consisting of magnesium silicate and mica, 5 to 50% by weight of component C selected from the group consisting of lead, tin, lead-tin alloy and a mixture thereof, and the balance of polytetrafluoroethylene.

In a tenth aspect of the present invention, there is provided a sliding member comprising a metal mesh and a sliding layer composed of a resin composition which is filled in and coated on the said metal mash, the said resin composition comprising 1 to 25% by weight of component A selected from the group consisting of phosphates and barium sulfate, 1 to 15% by weight of component B selected from the group consisting of magnesium silicate and mica, 5 to 50% by weight of component C selected from the group consisting of lead, tin, lead-tin alloy and a mixture thereof, not more than 5% by weight of molybdenum disulfide, and the balance of polytetrafluoroethylene.

In an eleventh aspect of the present invention, there is provided a sliding member comprising a metal mesh and a sliding layer composed of a resin composition which is filled in and coated on the said metal mash, the said resin composition comprising 1 to 25% by weight of component A selected from the group consisting of phosphates and barium sulfate, 1 to 15% by weight of component B selected from the group consisting of magnesium silicate and mica, 5 to 50% by weight of component C selected from the group consisting of lead, tin, lead-tin alloy and a mixture thereof, not more than 4% by weight of graphite, and the balance of polytetrafluoroethylene.

In a twelfth aspect of the present invention, there is provided a sliding member comprising a metal mesh and a sliding layer composed of a resin composition which is filled in and coated on the said metal mash, the said resin composition comprising 1 to 25% by weight of component A selected from the group consisting of phosphates and barium sulfate, 1 to 15% by weight of component B selected from the group consisting of magnesium silicate and mica, 5 to 50% by weight of component C selected from the group consisting of lead, tin, lead-tin alloy and a mixture thereof, not more than 5% by weight of conductive carbon black, and the balance of polytetrafluoroethylene.

DETAILED DESCRIPTION OF THE INVENTION

Figure 1:
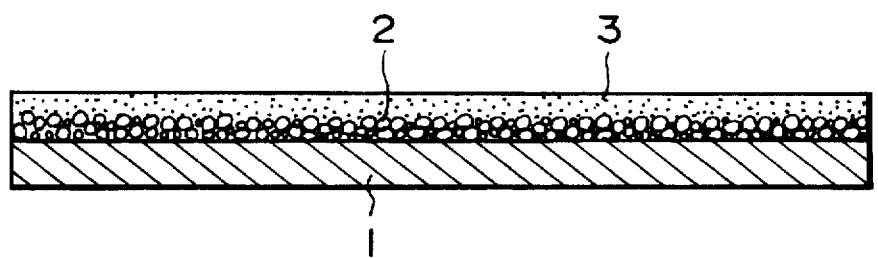
FIG. 1 is a sectional view of a sliding member according to the present invention.

The resin composition for a sliding member of the present invention is described in detail below.

PTFE used as main component of the resin composition in the present invention is commercially available as fine powder under the trade names of "Teflon 6CJ" (produced by Mitsui Du Pont Fluorochemical Co., Ltd.); "Polyflon F201" (produced by Daikin Industries Co., Ltd.); "Fluon CD-076", "Fluon CD-123", "Fluon CD-4" (produced by Asahi Glass Co., Ltd. ); etc.

It is also possible to use a mixture prepared by adding to the said fine powder a molding powder, for example, "Teflon 7AJ" (produced by Mitsui De Pont Fluorochemical Co., Ltd.) in an amount of not more than 20% by weight based on the resin composition.

The content of PTFE in the resin composition is the balance which is the remainder of subtraction of the amount of filler from the amount of the resin composition. It is preferably 40 to 93% by weight, more preferably 50 to 70% by weight.

The component A is selected from the group consisting of phosphates and barium sulfate. The phosphates and barium sulfate are not substances which show self-lubricating property, such as graphite or molybdenum disulfide. When blended in PTFE, they have an effect of facilitating formation of lubricating film of PTFE on the surface (sliding surface) of the a mating member.

Phosphates usable as component A in the present invention include metal salts thereof such as secondary phosphates and pyrophosphates. Alkaline earth metals are preferably used as metals for forming salts. Calcium hydrogenphosphate ($CaHPO_4(2H_2O)$) and calcium pyrophosphate ($Ca_2P_2O_7$) are especially preferred. The average particle size of phosphates used in the present invention is preferably not more than 20 μm, more preferably 1 to 10 μm.

Barium sulfate used in the present invention may be either precipitated barium sulfate or baryte barium sulfate. These types of barium sulfate are easily available as commercial product, for example, from Sakai Chemical Industries Co., Ltd. The average particle size of barium sulfate used in the present invention is preferably not more than 10 μm, preferably 1 to 5 μm.

The component A shows an effect of facilitating formation of the said lubricating film when blended only in a small content, for example, 1% by weight in PTFE, and continues to show such effect until its content reaches 25% by weight. When its content exceeds 25% by weight, there is formed too much amount of lubricating film on the mating member surface, which is rather detrimental to wear resistance. Therefore, the content (blending percentage) of the component A is 1 to 25% by weight, preferably 5 to 20% by weight, more preferably 10 to 20% by weight.

The component B is selected from the group consisting of magnesium silicate and mica. When magnesium silicate and mica are blended in PTFE, they facilitate to exhibit fully the peculiar low friction properties of PTFE and also contribute to the improvement of wear resistance.

Magnesium silicate used in the present invention is preferably one containing not less than 40.0% by weight of silicon dioxide ($SiO_2$) and not less than 10.0% by weight of magnesium oxide (MgO), with $SiO_2/MgO$ weight ratio being in the range of 2.1 to 5.0. For example, $2MgO \cdot 3SiO_2 \cdot nH_2O$ and $2MgO \cdot 6SiO_2 \cdot nH_2O$ are preferably used. Use of magnesium silicate in which the $SiO_2/MgO$ weight ratio is less than 2.1 or exceeds 5.0, deteriorates friction properties and wear resistance of PTFE. As mica, there can be used sericite, muscovite, biotite and the like.

The content (blending percentage) of the component B is 1 to 15% by weight, preferably 5 to 12% by weight, more preferably 8 to 10% by weight. When the amount is less than 1% by weight, the component B fails to produce its above-mentioned effect as filler, and when the content exceeds 15% by weight, it impairs the said effect of the component A.

The component C is selected from the group consisting of lead, tin, lead-tin alloy and mixtures thereof. The component C has an effect of improving wear resistance. The sliding member containing lead and/or tin are suited for use under dry condition. On the other hand, the sliding member containing lead-tin alloy is suited for use in-oil condition or under oil-lubricated condition. The content of tin in the lead-tin alloy is preferably 5 to 30% by weight based on the lead-tin alloy.

The content (blending percentage) of the component C is 5 to 50% by weight, preferably 20 to 40% by weight, more preferably 25 to 30% by weight. When the content is less than 5% by weight, there can not be obtained the desired effect of improving the wear resistance, and when the content exceeds 50% by weight, the wear resistance is rather deteriorated.

To the above-described resin composition for sliding member according to the present invention, there can also be added as the component D: (i) molybdenum disulfide for further improving friction properties and wear resistance of the sliding member in use in-oil condition or under oil-lubricated condition, (ii) graphite for further improving wear resistance in use under dry friction condition, or (iii) conductive carbon black for improving antistatic effect of the sliding member. Further, there may be added to the resin composition a mixture of graphite and conductive carbon black.

As for their contents added, the content of molybdenum disulfide is preferably not more than 5% by weight, more preferably 0.1 to 5% by weight; the content of graphite is preferably not more than 4% by weight, more preferably 0.1 to 3% by weight; and the content of conductive carbon black is not more than 5% by weight, more preferably 0.1 to 4% by weight.

A sliding member using the said resin composition and the production process thereof according to the present invention are now described.

First, a sliding member (I) comprising a thin steel plate as a steel backing and a porous sintered metal layer formed thereon, and a process for producing such a sliding member are explained.

As a steel backing, a structural rolled steel sheet is usually used, but other types of rolled steel sheet can be used depending on the purpose of use of the sliding member. As the steel sheet, a coiled continuous strip offered as hoop is preferably used, but it is also possible to use a strip cut to a suitable length. Such strips of steel may have been subjected to copper plating or other pertinent treatment for improving corrosion resistance.

The porous sintered metal layer is usually formed from a copper alloy having excellent friction and wear properties, such as bronze, lead bronze or phosphor bronze, but the said layer may be formed with other metals than copper alloy, such as aluminum alloy or iron, depending on the purpose of use of the produced sliding member. Metal powder used for forming the porous sintered metal layer is not specified in particle shape, the particles may be spherical or may be of irregular shape such as granular. The particle size is preferably such that the particles can pass through an 80-mesh screen but can not pass a 350-mesh screen.

In the porous sintered metal layer in the sliding member (I) according to the present invention, the alloy particles are strongly bound to each other as well as to the steel backing. The thickness of the said porous sintered metal layer is preferably about 0.10 to 0.40 mm, more preferably 0.20 to 0.30 mm, and the porosity is preferably about not less than 10 vol %, more preferably 15 to 40 vol %.

According to the present invention, PTFE powder and necessary fillers mentioned above are mixed, and after adding a petroleum solvent, the resultant mixture is stirred and mixed up to produce a wet composition. Mixing of PTFE and fillers is carried out at a temperature not exceeding the room temperature transition point (19° C.) of PTFE, preferably at 10° to 18° C. Stirring of the resulting mixture and the petroleum solvent is also conducted in the same temperature range. Use of such temperature conditions makes it possible to prevent fiberization of PTFE and to obtain a homogeneous mixture.

The petroleum solvents usable in the present invention include naphtha, toluene, xylene, aliphatic solvents and mixtures of aliphatic solvents with naphthenic solvents. The amount of petroleum solvent used in the present invention is 15 to 30 parts by weight based on 100 parts by weight of the mixture of PTFE and fillers. When the amount of petroleum solvent is less than 15 parts by weight, the produced wet composition shows unsatisfactory in malleability in the step of impregnating and coating the porous sintered metal layer with the composition, and consequently the said impregnation and coating of the composition tend to become uneven. On the other hand, when the amount of the petroleum solvent used exceeds 30 parts by weight, not only the impregnating and coating work become difficult to carry out but also uniformity of coating thickness of the resin composition is impaired, resulting in reduced adhesive strength between resin composition and porous sintered metal layer.

The sliding member (I) according to the present invention is produced by the following steps (a) to (d).

(a) The wet composition obtained according to the process of the present invention is spread over the porous sintered metal layer formed on the steel backing, and then is rolled to impregnate the composition in the porous sintered metal layer and to form simultaneously a coating layer of the said composition with a uniform thickness on the surface of the porous sintered metal layer. The thickness of the thus formed composition coating layer is 2 to 2.5 times the coating thickness actually required for the final product. Impregnation of the composition in the pores of the porous sintered metal layer is substantially accomplished in this step.

(b) The steel backing having the porous sintered metal layer and coated with the wet composition according to the above step (a) is kept in a 200°–250° C. drying oven for a few minutes to remove the petroleum solvent and then the dried composition layer is rolled down under pressure of 300 to 600 kgf/cm$^2$ to let it have a prescribed thickness.

(c) The steel backing having the rolled dry composition layer according to the above step (b) is introduced into a heating oven, sintered therein by heating at 360° to 380° C. for a few minutes to ten and a few minutes, then taken out of the oven and again rolled to correct the dimensional variation thereof.

(d) The steel backing having the sliding layer according to the above step (c) is cooled (e.g. air-cooled or allowed to cool by itself) and then, if necessary, subjected to corrective rolling to correct faulty form such as undulation, thereby obtaining an objective sliding member.

In the sliding member produced by the said steps (a) to (d), the thickness of the porous sintered metal layer is 0.10 to 0.40 mm, and the thickness of the sliding layer composed of the resin composition is 0.02 to 0.15 mm. The thus obtained product (sliding member) may be cut to a proper size for use as a flat sliding plate, or may be roundly bent to be used as a cylindrical winding bush.

Second, a sliding member (II) of the present invention using as a base, a metal mesh and a process for producing such a sliding member are described.

As metal mesh, there can be used, for example, (i) an expanded metal produced by setting a thin metal sheet between a fixed lower die having a rectilinear cutting blade and a movable upper die having an undulatory, trapezoidal, triangular or otherwise shaped cutting blade, conveying the said metal sheet in the orthogonal direction to the fixed die or the askew direction to the cutting blade of the fixed lower die, and moving the movable upper die reciprocatively in the up and down direction to form cuts in the metal sheet, with the cuts being expanded simultaneously, thereby forming regular mesh lines; (ii) a woven wire mesh obtained by weaving fine metal wires as warp and weft; and (iii) a knit wire mesh obtained by knitting fine metal wires.

The expanded metal used in the present invention is preferably one obtained by subjecting a 0.3–2 mm thick metal sheet to expanding processing, so that each strand would have a length of 0.1 to 1.5 mm and a thickness of 0.1 to 1.0 mm. The woven or knit wire mesh is preferably one obtained by weaving or knitting 0.1–0.5 mm sized metal wires to a 10–200 mesh texture.

Thin sheet or fine wire of stainless steel, copper, phosphor bronze alloy, bronze alloy, iron or the like is preferably used as material for forming the said expanded metal or woven or knit wire mesh.

The sliding member (II) of the present invention is produced through the following steps (a) to (c). The resin composition used in this embodiment may be the same as used in production of a sliding member (I) described above.

(a) The wet composition is spread on a metal mesh composed of the expanded metal, or the woven or knit wire mesh, and then rolled down to fill the said composition in the meshes while forming a coating layer of resin composition with a uniform thickness on the surface of the metal mesh. Thickness of the coating layer in this step is 2 to 2.5 times the coating thickness required for the final product.

(b) The metal mesh coated with the wet composition according to the above step (a) is kept in a 200°–250° C. drying oven for a few minutes to remove the petroleum solvent and then the dried resin composition layer is rolled under pressure of 300 to 600 kgf/cm$^2$ to let it have a prescribed thickness.

(c) The metal mesh having the rolled dry composition layer according to the above step (b) is introduced into a heating oven, sintered therein at 360° to 380° C. for a few minutes to ten and a few minutes, then taken out of the oven and again rolled to correct the dimensional variation thereof, thereby obtaining an objective sliding member.

In the sliding member obtained through the above steps (a) to (c), the thickness of the coating layer composed of the resin composition formed on the metal mesh surface is usually 0.05 to 1.0 mm. The product thus obtained may be cut to a suitable size for use as a flat sliding plate or may be roundly bent to be used as a cylindrical winding bush.

In a no-lubrication thrust test conducted at sliding speed of 10 m/min under load of 120 kgf/cm$^2$ for 8 hours, the sliding member (I) of the present invention shows a friction coefficient of 0.06 to 0.12 and an abrasion amount of not more than 30 μm, and indicates excellent sliding characteristics under high-load condition.

Also, in an oil-lubricated reciprocative sliding test conducted at sliding speed of 5 m/min under load of 200 kgf/cm$^2$ for 8 hours, the sliding member (I) of the present invention shows a friction coefficient of 0.012 to 0.062 and an abrasion amount of not more than 30 μm, and indicates excellent sliding characteristics under high load condition.

Meanwhile, in a no-lubrication thrust test conducted at sliding speed of 5 m/min under load of 100 kgf/cm$^2$ for 8 hours, the sliding member (II) of the present invention shows a friction coefficient of 0.06 to 0.12 and an abrasion amount of not more than 20 μm, and indicates excellent sliding characteristics under high load condition.

Further, in a no-lubrication thrust test at sliding rate of 10 m/min under load of 120 kgf/cm$^2$ for 8 hours, the graphite-containing sliding members (I) and (II) of the present invention show a friction coefficient of 0.06 to 0.12 and an abrasion amount of not more than 25 μm, and demonstrate excellent sliding characteristics under high load condition, respectively.

Still further, in an oil-lubricated reciprocative sliding test at sliding rate of 10 m/min under load of 200 kgf/cm$^2$ for 8 hours, the molybdenum disulfide-containing sliding members (I) and (II) of the present invention show a friction coefficient of 0.011 to 0.030 and an abrasion amount of not more than 25 μm, and demonstrate excellent sliding characteristics under high load condition, respectively.

Furthermore, in a no-lubrication thrust test at sliding rate of 10 m/min under load of 120 kgf/cm$^2$ for 8 hours, the conductive carbon black-containing sliding members (I) and (II) of the present invention show a friction coefficient of 0.07 to 0.15, an abrasion amount of not more than 30 μm and an electric conductivity of not more than $1 \times 10^8 \Omega \cdot cm$ in terms of volume resistivity, and demonstrate excellent sliding characteristics under high load condition, respectively.

As seen from the above, the sliding member composed of the resin compositions according to the present invention show excellent sliding characteristics such as a stabilized low friction coefficient, and a very low abrasion amount under dry (no lubrication) condition, or in-oil or under oil-lubricated condition.

EXAMPLES

The present invention is described in further detail below with reference to the examples thereof, which examples, however, are merely intended to be illustrative and not to be construed as limiting the scope of the invention.

Thrust Test (1)

The friction coefficient and abrasion amount were measured under the conditions specified below.

As regards the friction coefficient, the values of the friction coefficient during the period from one hour after start of the test till the end of the test was shown by the range of the maximum and minimum thereof. As for the abrasion amount, the amount of dimensional change of the sliding surface after the 8-hour test was shown.

Test Conditions

Sliding speed: 10 m/min

Load: 120 kgf/cm$^2$

Test time: 8 hours

Lubricant: no lubrication

Mating member: Carbon steel for machine structure use (S45C)

Reciprocative Sliding Test

The friction coefficient and abrasion amount were measured under the conditions specified below.

As regards the friction coefficient, the values of the friction coefficient during the period from one hour after start of the test till the end of the test was shown by the range of the maximum and minimum thereof. As for the abrasion amount, the amount of dimensional change of the sliding surface after the 8-hour test was shown.

Test Conditions

Sliding speed: 5 m/min

Load: 200 kgf/cm$^2$

Test time: 8 hours

Lubricant: Initial application of ATF-D II (produced by Idemitsu Kosan Co., Ltd) on the sliding surface Mating member: Cr-plated carbon steel for machine structure use (S45C)

Thrust Test (2)

The friction coefficient and abrasion amount were measured under the conditions specified below. As regards the friction coefficient, the values of the friction coefficient during the period from one hour after start of the test till the end of the test was shown by the range of the maximum and minimum thereof. As for the abrasion amount, the amount of dimensional change of the sliding surface after the 8-hour test was shown.

Test Conditions

Sliding speed: 5 m/min

Load: 100 kgf/cm$^2$

Test time: 8 hours

Lubricant: no lubrication

Mating member: Carbon steel for machine structure use (S45C)

Volume Resistivity

The volume resistivity in the direction orthogonal to the sliding member surface was measured by a four-probe method [probes were set on the specimen surface at intervals of 5 mm and volume resistivity in the said direction was measured by a resistivity meter LORESTA-AP, MCP-T400 (manufactured by Mitsubishi Chemical Corporation)].

Examples 1–24 and Comparative Examples 1–3

In the following Examples, Teflon 6CJ (produced by Mitsui Du Pont Fluorochemical Co., Ltd.) was used as PTFE, and a mixed solvent ("Exol" produced by Exon Chemical Co., Ltd.) composed of an aliphatic solvent and a naphthenic solvent was used as a petroleum solvent.

PTFE and fillers shown in Table 1 were mixed by stirring in a Henschel mixer. To 100 parts by weight of the resulting mixture was blended 20 parts by weight of the petroleum solvent, followed by mixing at a temperature (15° C.) below the room temperature transition point of PTFE to prepare a composition.

This obtained composition was spread on a porous sintered metal layer (thickness: 0.25 mm) formed on a thin steel backing (thickness: 0.70 mm) and pressed down by a roller, so that the thickness of the composition layer would become 0.25 mm, thereby forming a composite-layered plate in which the pores and surface of the porous sintered metal layer were impregnated and coated with the said composition. This composite-layered plate was kept in a 200° C. hot-air drying oven for 5 minutes to remove the petroleum solvent, and the dried composition layer was rolled under pressure of 400 kgf/cm$^2$ to reduce the thickness of the composition layer coating the porous sintered metal layer to 0.10 mm.

The thus treated composite-layered plate was sintered in a heating oven at 370° C. for 10 minutes and again rolled to make dimensional adjustment and correction of faulty form such as undulation to produce a composite-layered sliding member. The thus produced sliding member was cut into a 30 mm×30 mm test piece. FIG. 1 shows a sectional view of the thus obtained composite-layered sliding member. In the figure, the sliding member is composed of a steel backing 1, a porous sintered metal layer 2 formed on the steel backing 1, and a coating layer (sliding layer) 3 of the resin composition which fills in the pores and coat on the surface of the said porous sintered metal layer 2.

The results of thrust test (1) on the composite-layered sliding member are shown in Table 1. In the table, SiO$_2$/MgO signifies SiO$_2$ to MgO weight ratio, and the blending amount is shown by "% by weight".

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Ex. 12 | Ex. 13 | Ex. 14 | Ex. 15 | Ex. 16 | Ex. 17 | Ex. 18 | Ex. 19 | Ex. 20 | Ex. 21 | Ex. 22 | Ex. 23 | Ex. 24 |
|---|---|---|---|---|---|---|---|---|---|---|---|---|---|---|---|---|---|---|---|---|---|---|---|---|---|
| | PTFE | 80 | 70 | 65 | 60 | 60 | 55 | 55 | 50 | 55 | 50 | 45 | 40 | 40 | 55 | 55 | 50 | 50 | 45 | 45 | 45 | 40 | 45 | 35 | 35 |
| Component A | Calcium hydrogenphosphate | 5 | 10 | 15 | 15 | 10 | 15 | — | — | — | — | — | — | — | — | — | 5 | — | — | — | — | 5 | 10 | 10 | 10 |
| | Calcium pyrophosphate | — | — | — | — | — | — | — | — | — | — | — | — | — | 5 | 10 | — | — | — | — | — | — | — | — | — |
| | Barium sulfate | — | — | — | — | — | — | 15 | 15 | 10 | 15 | 20 | 25 | 15 | — | — | — | 10 | 10 | 15 | 15 | | | | |
| | Barium sulfate (Type) | — | — | — | — | — | — | Baryte powder | Baryte powder | Precipitated | Precipitated | Precipitated | Baryte powder | Baryte powder | — | — | — | Baryte powder | Baryte powder | Baryte powder | Baryte powder | | | | |
| Component B | Magnesium silicate | 5 | 10 | 10 | 15 | 10 | 10 | 10 | 15 | 10 | 10 | 10 | 10 | 15 | 10 | 5 | 15 | — | — | — | — | | | | |
| | SiO$_2$/MgO | 2.2 | 2.2 | 2.2 | 2.2 | 2.2 | 2.2 | 2.2 | 2.2 | 4.5 | 4.5 | 2.2 | 2.2 | 4.5 | 2.2 | 2.2 | 2.2 | — | — | — | — | | | | |
| | Mica | — | — | — | — | — | — | — | — | — | — | — | — | — | — | — | — | 10 | 15 | 10 | 10 | | | | |
| | Mica (type) | — | — | — | — | — | — | — | — | — | — | — | — | — | — | — | — | Muscovite | Muscovite | Muscovite | Biotite | | | | |
| Component C | Lead | — | 10 | 10 | 10 | — | 20 | 20 | 20 | 25 | 25 | 25 | — | 30 | 30 | 30 | 30 | — | — | 30 | 30 | | | | |
| | Tin | 10 | — | — | — | — | — | — | — | — | — | — | — | — | — | — | — | 30 | — | — | — | | | | |
| | Lead-tin alloy (tin: 25 wt %) | — | — | — | — | 20 | — | — | — | — | — | — | 25 | — | — | — | — | — | 30 | — | — | | | | |
| Thrust test (1) | Friction coefficient (× 10$^{-2}$) | 8–12 | 8–10 | 7–9 | 7–10 | 6–9 | 6–8 | 7–9 | 7–9 | 7–9 | 7–9 | 7–9 | 7–8 | 7–9 | 7–10 | 7–10 | 7–9 | 7–9 | 7–9 | 6–9 | 7–10 | | | | |
| | Abrasion amount (μm) | 30 | 22 | 13 | 15 | 13 | 12 | 8 | 8 | 7 | 6 | 10 | 12 | 7 | 8 | 8 | 9 | 15 | 15 | 12 | 20 | | | | |

TABLE 1-continued

|  |  |  |  |  |  |
|---|---|---|---|---|---|
|  | pyrophosphate |  |  |  |  |
|  | Barium sulfate | — | — | — | — |
|  | Barium sulfate (Type) | — | — | — | — |
| Component B | Magnesium silicate | 15 | 5 | 15 | 5 |
|  | SiO$_2$/MgO | 4.5 | 4.5 | 2.2 | 2.2 |
|  | Mica | — | — | — | — |
|  | Mica (type) | — | — | — | — |
| Component C | Lead | — | 40 | 40 | 50 |
|  | Tin | — | — | — | — |
|  | Lead-tin alloy (tin: 25 wt %) | 40 | — | — | — |
| Thrust test (1) | Friction coefficient ($\times 10^{-2}$) | 7–8 | 6–9 | 6–8 | 8–11 |
|  | Abrasion amount (μm) | 25 | 18 | 19 | 20 |

|  |  | Comp. Ex. 1 | Comp. Ex. 2 | Comp. Ex. 3 |
|---|---|---|---|---|
|  | PTFE | 80 | 70 | 70 |
| Component A | Calcium hydrogenphosphate | — | 10 | — |
|  | Calcium pyrophosphate | — | — | — |
|  | Barium sulfate | — | — | 10 |
|  | Barium sulfate (Type) | — | — | Baryte powder |
| Component B | Magnesium silicate | — | — | — |
|  | SiO$_2$/MgO | — | — | — |
|  | Mica | — | — | — |
|  | Mica (type) | — | — | — |
| Component C | Lead | 20 | 20 | 20 |
|  | Tin | — | — | — |
|  | Lead-tin alloy (tin: 25 wt %) | — | — | — |
| Thrust test (1) | Friction coefficient ($\times 10^{-2}$) | 12–17 | 12–15 | 11–14 |
|  | Abrasion amount (μm) | 70 | 53 | 47 |

As is seen from the above test results, the composite-layered sliding member according to the Examples of the present invention exhibited a stabilized performance while maintaining low friction coefficient throughout the test time, and also their abrasion amount after the test time was as small as not more than 30 μm, indicating very excellent sliding characteristics. On the other hand, the composite-layered sliding member according to the Comparative Examples, although relatively stabilized in friction coefficient, suffered much abrasion amount to show poor sliding characteristics.

Then, each of the composite-layered plates of Examples 3, 6, 8, 10, 13, 14, 18 and 21 and Comparative Examples 1 and 3 was cut and bend-worked to make a half-cylindrical test piece measuring 10.0 mm in radius, 20.0 mm in length and 1.05 mm in thickness, and it was subjected to the reciprocative sliding test (2). The results are shown in Table 2.

TABLE 2

|  | Ex. 3 | Ex. 6 | Ex. 8 | Ex. 10 | Ex. 13 |
|---|---|---|---|---|---|
| Friction coefficient ($\times 10^{-3}$) | 16–53 | 12–62 | 12–50 | 12–44 | 13–38 |
| Abrasion amount (μm) | 28 | 28 | 21 | 23 | 20 |

|  | Ex. 14 | Ex. 18 | Ex. 21 | Comp. Ex. 1 | Comp. Ex. 3 |
|---|---|---|---|---|---|
| Friction coefficient ($\times 10^{-3}$) | 14–46 | 13–50 | 14–40 | 12* | 13–130 |
| Abrasion amount (μm) | 22 | 28 | 26 | 90 | 83 |

Note *: Testing of the test piece of Comparative Example 1 was stopped because of sharp rise of friction coefficient at one hour after start of the test. The value of abrasion amount shown in the Table 2 is the one observed at the time when the test was stopped.

As is noted from the test results, the composite-layered sliding member according to the present invention showed a stabilized performance maintaining low friction coefficient throughout the test period and had little abrasion amount after the test.

Examples 25–34 and Comparative Examples 4–5

In the following Examples, Teflon 6CJ (produced by Mitsui Du Pont Fluorochemical Co., Ltd.) was used as PTFE, and a mixed solvent ("Exol" produced by Exon Chemical Co., Ltd.) composed of an aliphatic solvent and a naphthenic solvent was used as a petroleum solvent.

PTFE and fillers shown in Table 3 were mixed by stirring in a Henschel mixer. To 100 parts by weight of the resulting mixture, 20 parts by weight of the petroleum solvent was blended and mixed at a temperature (15° C.) below the room temperature transition point of the PTFE to prepare a composition.

Meanwhile, a 0.30 mm-thick phosphor bronze alloy plate was expanded to form a 0.43 mm-thick expanded metal having regular meshes of each strand of 0.60 mm. This expanded metal was used as a metal mesh A.

Also, using 0.3 mm-size phosphor bronze alloy wires as weft and warp, a 50-mesh woven wire mesh was formed, and the obtained mesh was used as a metal mesh B.

The said composition was applied on each of the said metal meshes A and B, and pressed down by a roller, so that the meshes of the metal meshes would be filled up with the composition while forming a coating layer of the said composition on the surface of the metal meshes. These composites were kept in a 220° C. hot-air drying oven for 5 minutes to remove the petroleum solvent in the composition. Then the resulting composite was sintered in a heating oven at 360° C. for 10 minutes, and then rolled to make dimensional adjustment and correction of improper form such as undulation to obtain a composite product having a 0.13 mm-thick coating layer (sliding layer) on the surface. After correction, the composite product was cut to make a 30 mm×30 mm test piece.

Figure 2:
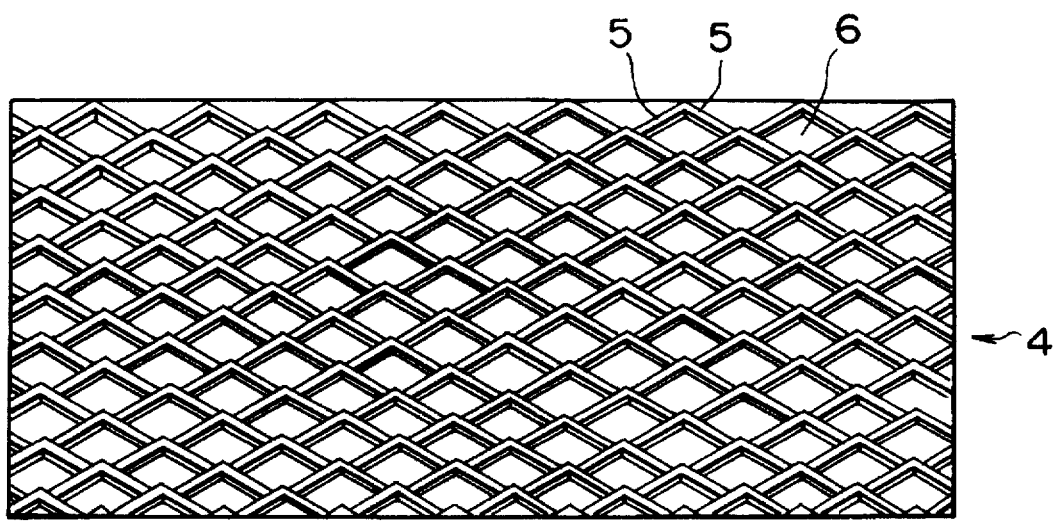
FIG. 2 is a plan view of an expanded metal used as a metal mesh.
Figure 3:
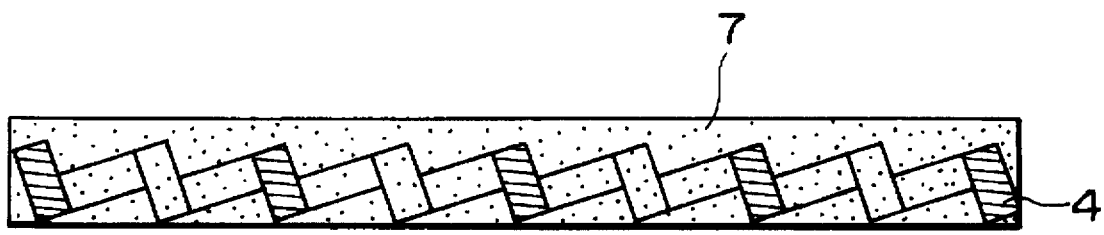
FIG. 3 is a sectional view of a sliding member using an expanded metal in the present invention.

FIG. 2 is a plan view of an expanded metal, and FIG. 3 is a sectional view of a sliding member using the expanded metal of FIG. 2 as a base. In the figures, the sliding member is composed of a expanded metal 4 having strands 5 and meshes 6, and a coating layer (sliding layer) 7 of the resin composition which fills in the meshes and coats on the surface of the expanded metal.

Figure 4:
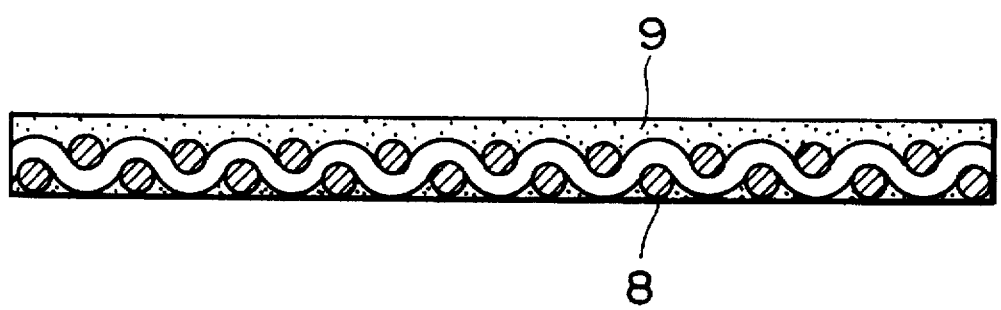
FIG. 4 is a sectional view of a sliding member using a woven wire mesh as a metal mesh in the present invention.

FIG. 4 is a sectional view of a sliding member using a woven wire mesh as a base. In the figure, the sliding member is composed of a woven wire mesh 8, and a coating layer (sliding layer) 9 of the resin composition which fills in the meshes and coats on the surface of the wire mesh.

The results of the thrust test (2) on the sliding member are shown in Table 3. In the table, SiO$_2$/MgO signifies SiO$_2$ to MgO weight ratio, and the blending amount is shown by "% by weight".

TABLE 3

| | | Ex. 25 | Ex. 26 | Ex. 27 | Ex. 28 |
|---|---|---|---|---|---|
| | PTFE | 65 | 60 | 55 | 50 |
| Component A | Calcium hydrogenphosphate | 15 | 15 | — | — |
| | Calcium pyrophosphate | — | — | — | — |
| | Barium sulfate | — | — | 15 | 15 |
| | Barium sulfate (Type) | — | — | Baryte powder | Baryte powder |
| Component B | Magnesium silicate | 10 | 15 | 10 | 15 |
| | SiO$_2$/MgO | 2.2 | 2.2 | 4.5 | 4.5 |
| | Mica | — | — | — | — |
| | Mica (type) | — | — | — | — |
| Component C | Lead | 10 | 10 | 20 | 20 |
| | Tin | — | — | — | — |
| | Lead-tin alloy (tin: 25 wt %) | — | — | — | — |
| Thrust test (2) | Base | A | A | A | A |
| | Friction coefficient (× 10$^{-2}$) | 6–9 | 6–8 | 5–7 | 5–7 |
| | Abrasion amount (μm) | 18 | 15 | 6 | 6 |

| | | Ex. 29 | Ex. 30 | Ex. 31 | Ex. 32 |
|---|---|---|---|---|---|
| | PTFE | 50 | 40 | 55 | 40 |
| Component A | Calcium hydrogenphosphate | — | — | — | — |
| | Calcium pyrophosphate | — | — | 10 | — |
| | Barium sulfate | 15 | 15 | — | 15 |
| | Barium sulfate (Type) | Precipitated | Baryte powder | — | Baryte powder |
| Component B | Magnesium silicate | 10 | 15 | 5 | — |
| | SiO$_2$/MgO | 4.5 | 4.5 | 4.5 | — |
| | Mica | — | — | — | 15 |
| | Mica (type) | — | — | — | Muscovite |
| Component C | Lead | 25 | 30 | 30 | 30 |
| | Tin | — | — | — | — |
| | Lead-tin alloy (tin: 25 wt %) | — | — | — | — |
| Thrust test (2) | Base | A | B | B | B |
| | Friction coefficient (× 10$^{-2}$) | 5–8 | 4–7 | 5–7 | 6–9 |
| | Abrasion amount (μm) | 5 | 4 | 5 | 12 |

TABLE 3-continued

| | | Ex. 33 | Ex. 34 | Ex. 35 | COMP. Ex. 4 | COMP. Ex. 5 |
|---|---|---|---|---|---|---|
| | PTFE | 45 | 35 | 35 | 80 | 80 |
| Component A | Calcium hydrogenphosphate | 10 | 10 | 10 | — | — |
| | Calcium pyrophosphate | — | — | — | — | — |
| | Barium sulfate | — | — | — | — | 20 |
| | Barium sulfate (Type) | — | — | — | — | Baryte powder |
| Component B | Magnesium silicate | 5 | 15 | 5 | — | — |
| | SiO$_2$/MgO | 2.2 | 2.2 | 2.2 | — | — |
| | Mica | — | — | — | — | — |
| | Mica (type) | — | — | — | — | — |
| Component C | Lead | 40 | 40 | 50 | 20 | — |
| | Tin | — | — | — | — | — |
| | Lead-tin alloy (tin: 25 wt %) | — | — | — | — | — |
| Thrust test (2) | Base | A | A | A | A | A |
| | Friction coefficient (× 10$^{-2}$) | 6–8 | 6–9 | 8–10 | 10–15 | 11–17 |
| | Abrasion amount (μm) | 14 | 15 | 18 | 60 | 65 |

As is seen from the above test results, the sliding member according to the Examples of the present invention showed stabilized performance while maintaining low friction coefficient throughout the test period and their abrasion amount in the test time was as small as not more than 20 μm, indicating excellent sliding characteristics. On the other hand, the sliding member according to the Comparative Examples were high in friction coefficient and suffered much abrasion amount to show poor sliding characteristics.

Examples 36–59

Compositions were prepared by following the procedure of Example 1 except that PTFE and fillers shown in Table 4 were mixed, and each of the obtained compositions was coated on a porous sintered metal layer formed on a steel backing to obtain a sliding member.

The results of thrust test (1) and reciprocative sliding test on the obtained sliding member are shown in Table 4. In the table, SiO$_2$/MgO signifies SiO$_2$ to MgO weight ratio, and the blending amount is shown by "% by weight".

TABLE 4

| | | Ex. 36 | Ex. 37 | Ex. 38 | Ex. 39 | Ex. 40 | Ex. 41 | Ex. 42 | Ex. 43 | Ex. 44 |
|---|---|---|---|---|---|---|---|---|---|---|
| | PTFE | 58 | 63 | 53 | 44 | 44 | 43 | 54 | 58 | 52 |
| Component A | Calcium hydrogen-phosphate | 10 | — | — | — | — | — | 10 | 5 | 10 |
| | Calcium pyrophosphate | — | — | — | — | — | — | — | — | — |
| | Barium sulfate | — | 5 | 10 | 20 | 20 | 20 | — | — | — |
| | Barium sulfate (Type) | — | Baryte powder | Baryte powder | Baryte powder | Precipitated | Precipitated | — | — | — |
| Component B | Magnesium silicate | 10 | 5 | 10 | 10 | 10 | 10 | 10 | 10 | 10 |
| | SiO$_2$/MgO | 2.2 | 2.2 | 2.2 | 2.2 | 2.2 | 2.2 | 2.2 | 2.2 | 2.2 |
| | Mica | — | — | — | — | — | — | — | — | — |
| | Mica (type) | — | — | — | — | — | — | — | — | — |
| Component C | Lead | 20 | 25 | 25 | 25 | 25 | 25 | 25 | 25 | 25 |
| | Tin | — | — | — | — | — | — | — | — | — |
| | Lead-tin alloy (tin: 25 wt %) | — | — | — | — | — | — | — | — | — |
| Component D | Molybdenum disulfide | 2 | 2 | 2 | 1 | 1 | 2 | 1 | 2 | 3 |
| | Graphite | — | — | — | — | — | — | — | — | — |
| | Conductive carbon black | — | — | — | — | — | — | — | — | — |
| Thrust test (1) | Friction coefficient ($\times 10^{-2}$) | 6~8 | 9~10 | 6~8 | 7~9 | 7~9 | 6~8 | 6~8 | 7~9 | 7~8 |
| | Abrasion amount (μm) | 9 | 20 | 6 | 11 | 10 | 8 | 6 | 9 | 7 |
| Reciprocative sliding test | Friction coefficient ($\times 10^{-3}$) | 11~22 | 13~23 | 12~21 | 13~30 | — | — | 12~25 | 11~22 | — |
| | Abrasion amount (μm) | 12 | 15 | 12 | 18 | — | — | 16 | 16 | — |

| | | Ex. 45 | Ex. 46 | Ex. 47 | Ex. 48 | Ex. 49 | Ex. 50 | Ex. 51 | Ex. 52 |
|---|---|---|---|---|---|---|---|---|---|
| | PTFE | 48 | 45 | 43 | 54 | 51 | 49.5 | 49 | 48 |
| Component A | Calcium hydrogen-phosphate | — | — | — | 10 | — | — | — | — |
| | Calcium pyrophosphate | — | — | — | — | — | — | — | — |
| | Barium sulfate | 10 | 10 | 15 | — | 10 | 10 | 10 | 10 |
| | Barium sulfate (Type) | Baryte powder | Baryte powder | Baryte powder | — | Baryte powder | Baryte powder | Baryte powder | Baryte powder |
| Component B | Magnesium silicate | 10 | 10 | 10 | 10 | 10 | 10 | 10 | 10 |
| | SiO$_2$/MgO | 2.2 | 2.2 | 2.2 | 2.2 | 2.2 | 2.2 | 2.2 | 2.2 |
| | Mica | — | — | — | — | — | — | — | — |
| | Mica (type) | — | — | — | — | — | — | — | — |
| Component C | Lead | 30 | 30 | 30 | 25 | 25 | 30 | 30 | 30 |
| | Tin | — | — | — | — | — | — | — | — |
| | Lead-tin alloy (tin: 25 wt %) | — | — | — | — | — | — | — | — |
| Component D | Molybdenum disulfide | 2 | 5 | 2 | — | — | — | — | — |
| | Graphite | — | — | — | 1 | 4 | 0.5 | 1 | 2 |
| | Conductive carbon black | — | — | — | — | — | — | — | — |
| Thrust test (1) | Friction coefficient ($\times 10^{-2}$) | 8~9 | 8~10 | 7~9 | 7~9 | 8~10 | 6~8 | 6~8 | 7~9 |
| | Abrasion amount (μm) | 6 | 28 | 6 | 5 | 25 | 4 | 5 | 8 |
| Reciprocative sliding test | Friction coefficient ($\times 10^{-3}$) | — | — | — | — | — | 14~46 | 13~43 | 13~55 |
| | Abrasion amount (μm) | — | — | — | — | — | 24 | 21 | 27 |

| | | Ex. 53 | Ex. 54 | Ex. 55 | Ex. 56 | Ex. 57 | Ex. 58 | Ex. 59 |
|---|---|---|---|---|---|---|---|---|
| | PTFE | 59 | 58 | 57 | 52 | 51 | 50 | 57 |
| Component A | Calcium hydrogen-phosphate | — | — | — | — | — | — | — |
| | Calcium pyrophosphate | — | — | — | — | — | — | — |
| | Barium sulfate | 10 | 10 | 10 | 10 | 10 | 10 | 10 |
| | Barium sulfate (Type) | Baryte powder | Baryte powder | Baryte powder | Baryte powder | Baryte powder | Baryte powder | Baryte powder |
| Component B | Magnesium silicate | 10 | 10 | 10 | 15 | 10 | 10 | 10 |
| | SiO$_2$/MgO | 2.2 | 2.2 | 2.2 | 2.2 | 2.2 | 2.2 | 2.2 |
| | Mica | — | — | — | — | — | — | — |
| | Mica (type) | — | — | — | — | — | — | — |
| Component C | Lead | 20 | 20 | 20 | 20 | 25 | 25 | 20 |
| | Tin | — | — | — | — | — | — | — |
| | Lead-tin alloy (tin: 25 wt %) | — | — | — | — | — | — | — |
| Component D | Molybdenum disulfide | — | — | — | — | — | — | — |
| | Graphite | — | — | — | — | — | — | 1 |
| | Conductive carbon black | 1 | 2 | 3 | 3 | 4 | 5 | 2 |
| Thrust test (1) | Friction coefficient ($\times 10^{-2}$) | 7~9 | 7~9 | 7~10 | 8~9 | 8~9 | 9~12 | 7~9 |
| | Abrasion amount (μm) | 9 | 11 | 11 | 10 | 14 | 22 | 10 |
| | Volume resistivity Ω · cm | $8.5 \times 10^6$ | $2.0 \times 10^3$ | $2.9 \times 10^2$ | $3.5 \times 10^2$ | $1.1 \times 10^2$ | $3.2 \times 10^1$ | $1.2 \times 10^3$ |

What is claimed is:

1. A sliding member comprising a steel backing, a porous sintered metal layer formed thereon, and a sliding layer composed of a resin composition which is impregnated in and coated on the said porous sintered metal layer; or a metal mesh and a sliding layer composed of a resin composition which is filled in and coated on the said metal mesh, the said resin composition consisting essentially of 1 to 25% by weight of component A selected from group consisting essentially of phosphates and barium sulfate, 1 to 15% by weight of component B selected from the group consisting of magnesium silicate and mica, 5 to 50% by weight of component C selected from the group consisting of lead, tin, lead-tin alloy and a mixture thereof, and the balance of polytetrafluoroethylene, wherein said resin composition further contains 0 to 5% by weight of molybdenum disulfide, 0 to 4% by weight of graphite and 0 to 5% by weight of conductive carbon black.

2. A sliding member according to claim 1, wherein the magnesium silicate contains not less than 40.0% by weight of silicon dioxide and not less than 10.0% by weight of magnesium oxide, with weight ratio of silicon dioxide to magnesium oxide being in the range from 2.1 to 5.0.

* * * * *